United States Patent [19]

Watt

[11] Patent Number: 5,014,745

[45] Date of Patent: May 14, 1991

[54] ARTICULATE DOWNSPOUT

[76] Inventor: Paul G. Watt, 6811 Vaughan, Detroit, Mich. 48228

[21] Appl. No.: 578,946

[22] Filed: Sep. 7, 1990

[51] Int. Cl.⁵ .............................................. F16L 27/00
[52] U.S. Cl. ........................................ 137/615; 52/16
[58] Field of Search ...................... 137/615, 873; 52/16

[56] References Cited

U.S. PATENT DOCUMENTS

| | | |
|---|---|---|
| 2,975,805 | 3/1961 | Horn . |
| 3,316,928 | 5/1967 | Weakley . |
| 3,375,851 | 4/1968 | Henry et al. . |
| 3,861,419 | 1/1975 | Johnson .............................. 137/615 |
| 3,911,954 | 10/1975 | Johnson . |
| 4,135,540 | 1/1979 | Felsen . |
| 4,270,572 | 6/1981 | Jarzynka . |

Primary Examiner—Martin P. Schwardron
Assistant Examiner—Kevin L. Lee
Attorney, Agent, or Firm—Brooks & Kushman

[57] ABSTRACT

An articulated downspout (10) is disclosed having an upper fluid duct (12), an elongated lower fluid duct (14) pivotably connected to the upper fluid duct (12), and a planar flap (16) also pivotably connected to the upper fluid duct (12). The lower fluid duct (14) pivots between a raised position where horticultural equipment can pass therebelow unimpeded, and a lowered position for the distribution of rainwater. The lower fluid duct (14) is released from its raised position in response to downward pressure exerted by rainwater on the collection portion (26) of the flap (16).

9 Claims, 2 Drawing Sheets

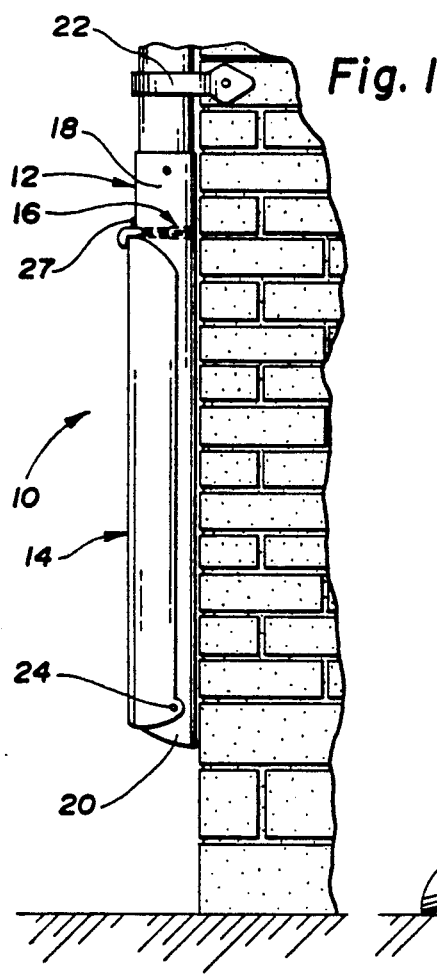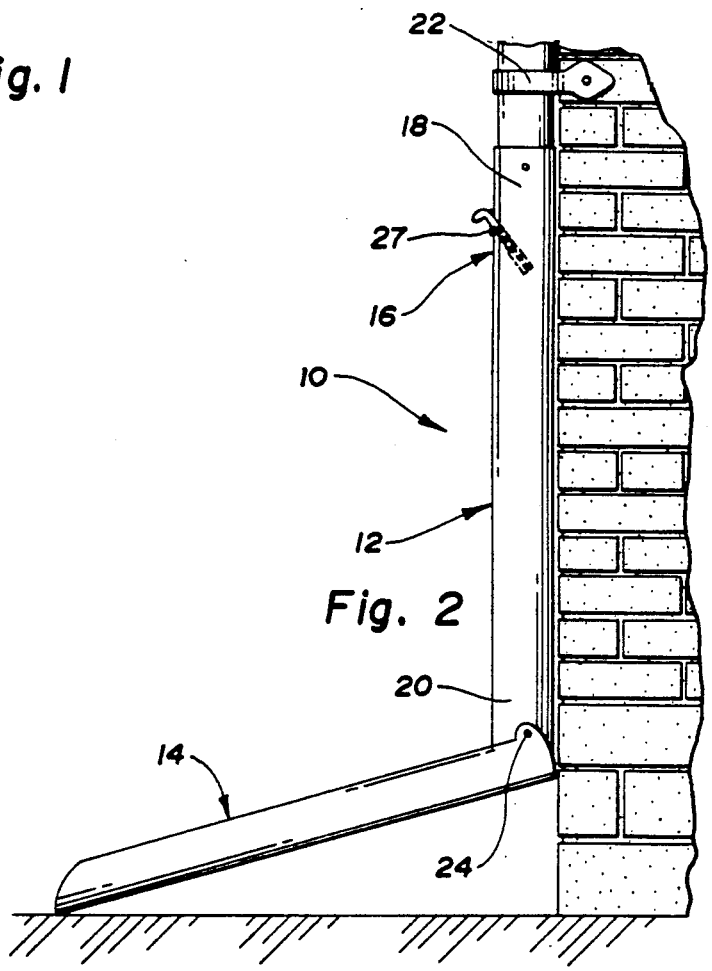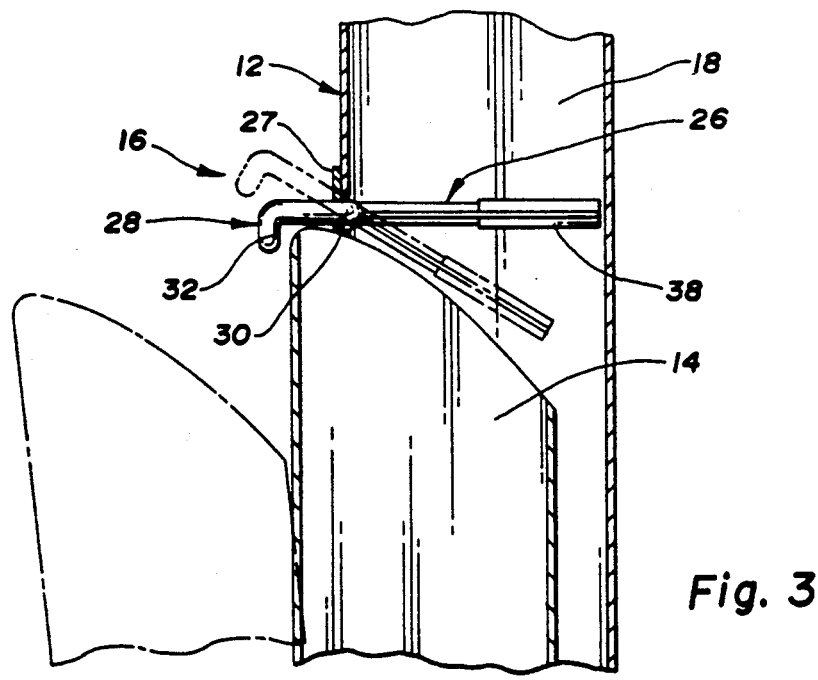

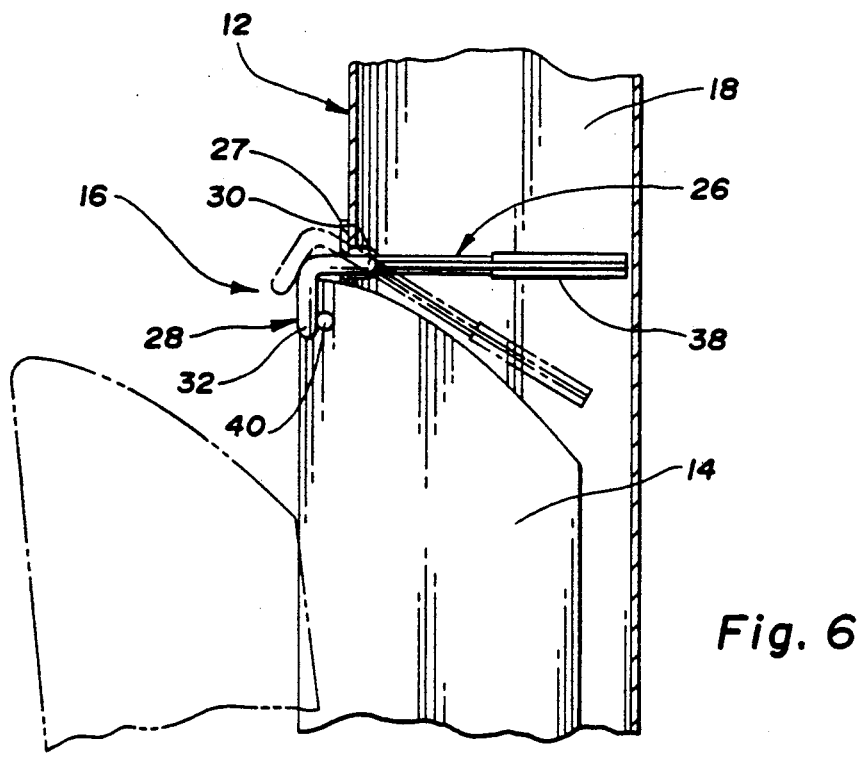
Fig. 6
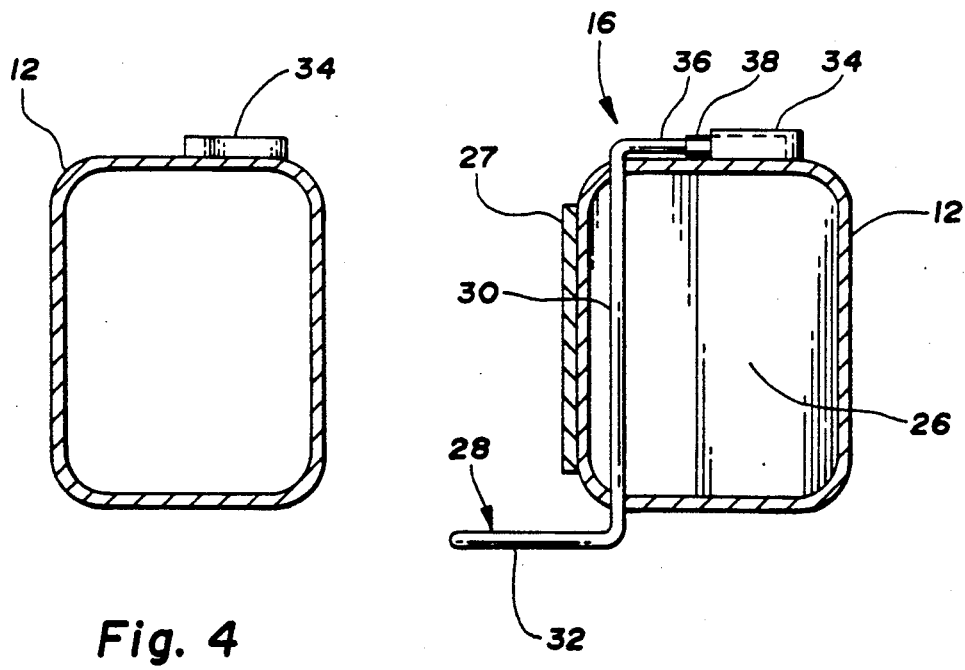
Fig. 4
Fig. 5

ARTICULATE DOWNSPOUT

TECHNICAL FIELD

This invention relates to water pressure actuated articulated downspouts.

BACKGROUND ART

Articulated downspouts are known in which a portion of the downspout is released from an initial storage position to a rainwater dispersal position. The purpose of such a design is to provide a storage position in which there is sufficient ground clearance for the unobstructed passage of lawn maintenance equipment such as lawn mowers, and a dispersal position in which rainwater is directed away from the foundation of the building to which the downspout is connected.

Conventionally, manual and electric means have been employed for actuating the articulated downspout. Several methods have also been devised for releasing the hinged portion of the downspout in response to the accumulation of rainwater in the downspout itself. For example, U.S. Pat. No. 3,375,851 to Henry, issued Apr. 2, 1968, discloses a hinged downspout assembly in which the lower portion of the downspout is released when a counterbalance receptacle located therein fills with rainwater. A drawback to this design, however, is that release is accomplished by shifting the center of gravity of the hinged portion to a position outside the imaginary vertical plane defined by the hinge. This results in an actuation means which is overly sensitive, and may require some additional retaining means to prevent actuation by the wind.

U.S. Pat. No. 3,316,928 to Weakley, issued May 2, 1967, discloses a downspout attachment which is released from its rest position by the flow of water against a vane located in the horizontal lower section of the downspout. Because of the vane's positioning, only a small cross-section is exposed to the flow of water through the downspout. Thus, the articulation means may not be responsive in a light rainfall.

DISCLOSURE OF THE INVENTION

I have invented a novel articulated downspout for disbursing rainwater collected by the gutters of a building. My articulated downspout comprises an upper fluid duct having an upper portion adapted to receive rainwater and a lower portion, an elongated lower fluid duct pivotably connected to the lower portion of the upper fluid duct, and a planar flap pivotably connected to the upper fluid duct. The lower fluid duct is movable between a raised position in which it lies substantially parallel to and proximate the upper fluid duct, and a lowered position in which it lies below the lower portion of the upper fluid duct. The flap extends at least partially within the upper fluid duct and includes a collection segment which is adapted to move downwardly from a substantially horizontal position in response to pressure exerted by the rainwater received by the upper fluid duct, and a latch segment. The latch segment has an inner end connected to the collection segment of the flap and an outer end which extends into selective engagement with the lower fluid duct when the lower fluid duct is in the raised position. In response to pressure exerted by the rainwater received by the upper fluid duct, the collection segment moves downwardly and the flap pivots, thereby releasing the lower fluid duct from the raised position so that the lower fluid duct may fall to the lowered position.

Accordingly, it is an object of my invention to provide an improved articulated downspout which has a raised or storage position under which horticultural equipment can pass unobstructed, and a lowered or dispersal position for the distribution of rainwater.

Another object of my invention is to provide an articulated downspout which is actuated to the lowered position by a light rainfall without manual intervention.

These and other objects, features, and advantages of the present invention will be more apparent from the following description and drawings.

BRIEF DESCRIPTION OF THE DRAWINGS

FIG. 1 is a side view of an articulated downspout according to the present invention shown in a raised position.

FIG. 2 is a side view of the articulated downspout in a lowered position showing upper and lower fluid ducts.

FIG. 3 is a sectional view of the articulated downspout, with flap and lower fluid duct positions after release shown in phantom.

FIG. 4 is a cross-sectional view of an alternative embodiment of the articulated downspout showing the upper fluid duct below the flap.

FIG. 5 is a cross-sectional view of the upper fluid duct similar to FIG. 4 taken above the flap and showing the position of the flap before release.

FIG. 6 is a sectional view of an alternative embodiment of the articulated downspout with latch segment and lower fluid duct positions after release shown in phantom.

BEST MODE FOR CARRYING OUT THE INVENTION

With reference to the drawings, a preferred embodiment of the present invention will be described. FIG. 1 shows the articulated downspout generally designated 10. The articulated downspout 10 comprises an upper fluid duct 12, an elongated lower fluid duct 14 pivotably connected to the upper fluid duct 12, and a planar flap 16 also pivotably connected to the upper fluid duct 12. The upper fluid duct 12 has an upper portion 18 which is adapted to receive rainwater, and a lower portion 20. The upper fluid duct 12 may be attached to the side of a building, for example by a bracket 22.

The lower fluid duct 14 is pivotably connected, for example by pin 24, to the lower portion 20 of the upper fluid duct 12. The lower fluid duct 14 is preferably concave, and is movable between a raised position in which it lies substantially parallel to and proximate the upper fluid duct 12, and a lowered position. In the raised position shown in FIG. 1, the lower portion 20 of the upper fluid duct 12 is spaced apart from the ground to enable the passage therebetween of horticultural equipment such as a lawn mower.

FIG. 2 shows the articulated downspout 10 with the lower fluid duct 14 in the lowered position wherein the duct 14 lies below the lower portion 2 of the upper fluid duct 12 such that rainwater can be distributed therefrom.

Referring now to FIG. 3, it can be seen that the planar flap 16 is pivotably connected to the upper portion 18 of the upper fluid duct 12, and extends into the upper fluid duct 12. The flap 16 includes a collection segment 26 which is adapted to move downwardly from a substantially horizontal position to an angled position, for example to the position shown in phantom, in response to pressure exerted by the rainwater received by the upper fluid duct 12. In this preferred embodiment, the collection segment is initially perpendicular to the vertical downspout and moves downwardly relative to the upper fluid duct 12 in response to downward pressure exerted by the rainwater, but it should be understood that the downspout might be oriented at some other angle. A faceplate 27 is attached to the exterior surface of the upper fluid duct 12 and retains the collection segment 26 of the flap 16 therewithin.

The flap 16 also includes a latch segment 28. The latch segment 28 has an inner end 30 connected to the collection segment 26 of the flap 16, and also has an outer end 32. The outer end 32 extends into selective engagement with the lower fluid duct 14 when the lower fluid duct 14 is in the raised position, and the outer end 32 is movable upwardly to disengage the lower fluid duct 14 in response to the rainwater pressure upon the collection segment 26. When the flap 16 pivots to its position shown in phantom line in FIG. 3, the lower fluid duct 14 is thereby released from the raised position so that it may pivot to the lowered position shown in FIG. 2 without manual intervention.

Referring now to FIG. 4, there is shown a cross-section of the upper fluid duct 12 taken below the flap 16. A magnet 34 is attached to the exterior surface of the upper fluid duct 12 proximate the flap 16. The magnet 34 keeps the flap 16 in its initial position, as explained in greater detail below.

FIG. 5 is a cross-sectional view of the upper fluid duct 12 taken above the flap 16 and showing the position of the flap 16 before release. The collection segment 26 is disposed within the upper fluid duct 12, and is connected to the inner end 30 of the latch segment 28. The latch segment 28 includes an extension 36 to which a metallic sleeve 38 is fitted such that when the outer end 32 of the latch segment 28 engages the lower fluid duct 14 in the raised position, the sleeve 38 is proximate and adjacent to the magnet 34. While the latch segment 28 and the collection segment 26 may be constructed from any suitable materials, the sleeve 38 is formed from any material which will be attracted by the magnet 34. Thus, the magnet 34 initially retains the collection segment 26 in the substantially horizontal position until the downward force exerted by the rainwater on the collection segment 26 exceeds the magnetic attraction force between the magnet 34 and the metal sleeve 38 of the flap 16.

Although the latch segment depicted in FIGS. 3-5 and described above constitutes a preferred embodiment, the outer end of the latch segment may be constructed with any means for selectively engaging the lower fluid duct which performs the same function. For example, the outer end 32 of the latch segment 28 might be replaced with a pawl, i.e. a lever with a catch that engages a pin on the lower fluid duct, or engages the notches of a ratchet wheel. FIG. 6 shows one such preferred embodiment wherein a pin 40 is attached to and projects away from the exterior surface of the lower fluid duct 14 such that the latch segment 28 selectively engages the pin 40, and thus the lower fluid duct 14, when the lower fluid duct 14 is in the raised position.

In another alternative embodiment of the articulated downspout, the lower fluid duct 14 has a length less than the distance between the lowermost point of the lower portion 20 of the upper fluid duct 12 and the ground. This results in the lower fluid duct 14 lying in the lowered position generally vertically below the upper fluid duct 12, instead of extending downwardly and outwardly therefrom. This embodiment has an application, for example, in a situation where two buildings are close together, or where the lower fluid duct 14 would otherwise extend into a traveled path.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. An articulated downspout comprising:
   an upper fluid duct having an upper portion adapted to receive rainwater and a lower portion;
   an elongated lower fluid duct pivotably connected to the lower portion of the upper fluid duct and being movable between a raised position in which the lower fluid duct lies substantially parallel to and proximate the upper fluid duct, and a lowered position in which the lower fluid duct lies below the lower portion of the upper fluid duct such that rainwater can be distributed therefrom, the lower portion of the upper fluid duct being spaced apart from the ground to enable the passage therebetween of horticultural equipment; and
   a planar flap pivotably connected to the upper fluid duct such that at least a portion of the flap extends therewithin, the flap including:
   a collection segment adapted to move downwardly from a substantially horizontal position in response to pressure exerted by the rainwater received by the upper fluid duct, and
   a latch segment having an inner end connected to the collection segment and an outer end extending into selective engagement with the lower fluid duct when in the raised position thereof, the outer end of the latch segment being movable upwardly to disengage the lower fluid duct in response to pressure exerted by the rainwater upon the collection segment, thereby releasing the lower fluid duct from the raised position so that the lower fluid duct may pivot from the raised position thereof to the lowered position thereof without manual intervention.

2. The articulated downspout of claim 1 further comprising magnetic means attached to the upper fluid duct proximate the flap for initially retaining the collection segment of the flap in the substantially horizontal position until the downward force exerted by the rainwater on the collection segment exceeds the magnetic attraction force between the magnetic means and the flap.

3. The articulated downspout of claim 1 wherein the flap is pivotably connected to the upper portion of the upper fluid duct.

4. The articulated downspout of claim 1 wherein the collection segment of the flap is adapted to move downwardly relative to the upper fluid duct in response to downward pressure exerted by the rainwater received by the upper fluid duct.

5. The articulated downspout of claim 1 wherein the outer end of the latch segment includes a means for selectively engaging the lower fluid duct.

6. The articulated downspout of claim 5 wherein the means for selectively engaging the lower fluid duct comprises a pawl.

7. The articulated downspout of claim 5 wherein the lower fluid duct includes an exterior surface, and a pin attached to and projecting from the exterior surface of the lower fluid duct for attachment to the means for selectively engaging the lower fluid duct in the raised position thereof.

8. The articulated downspout of claim 1 wherein the lower portion of the upper fluid duct is spaced apart from the ground a distance less than the length of the lower fluid duct such that the lower fluid duct in its lowered position extends downwardly and outwardly from the upper fluid duct.

9. The articulated downspout of claim 1 wherein the lower portion of the upper fluid duct is spaced apart from the ground a distance more than the length of the lower fluid duct such that the lower fluid duct in its lowered position lies generally vertically below the upper fluid duct.

* * * * *